(12) United States Patent
Romblom et al.

(10) Patent No.: US 9,759,228 B2
(45) Date of Patent: *Sep. 12, 2017

(54) TURBOCHARGER AND AIR INDUCTION SYSTEM INCORPORATING THE SAME AND METHOD OF USING THE SAME

(75) Inventors: Edward R. Romblom, De Witt, MI (US); Ronald M. Tkac, Brighton, MI (US); Gary J. Arvan, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1361 days.

This patent is subject to a terminal disclaimer.

(21) Appl. No.: 12/580,294

(22) Filed: Oct. 16, 2009

(65) Prior Publication Data

US 2011/0088393 A1  Apr. 21, 2011

(51) Int. Cl.
*F02B 33/44* (2006.01)
*F04D 31/00* (2006.01)
(Continued)

(52) U.S. Cl.
CPC ........ *F04D 29/4206* (2013.01); *F02B 37/183* (2013.01); *F02M 26/09* (2016.02);
(Continued)

(58) Field of Classification Search
CPC ............... F02B 37/183; F02B 29/0406; F02M 25/0712; F02M 25/0747; F02M 25/0707; F02M 25/0728; F02M 35/116; F02M 26/09; F02M 26/41; F02M 26/05; F02M 26/25; F04D 25/04; F04D 29/4206; F04D 29/4246; Y02T 10/144; Y02T 10/121
(Continued)

(56) References Cited

U.S. PATENT DOCUMENTS 4,179,892 A * 12/1979 Heydrich ................ F02B 37/00
                                                                60/605.2
5,046,317 A *  9/1991 Satokawa ........................ 60/602
(Continued)

FOREIGN PATENT DOCUMENTS

JP         S5512334         9/1980

OTHER PUBLICATIONS

Office Action regarding related IN App. No. 1144/KOL/2010; dated Jun. 2, 2017; 8 pgs.

*Primary Examiner* — Jason Shanske
*Assistant Examiner* — Matthew T Largi
(74) *Attorney, Agent, or Firm* — Cantor Colburn LLP (57) ABSTRACT

A turbocharger having a turbine housing with an integral EGR conduit is disclosed. The turbine includes a turbine wheel attached to a turbine shaft and rotatably disposed in a turbine housing having a turbine volute conduit having a turbine inlet passage fluidly coupled to a turbine volute conduit having a turbine volute passage and a turbine volute inlet and an EGR conduit having an EGR passage, the EGR passage having an EGR conduit inlet, the EGR conduit inlet disposed on the turbine inlet conduit. The turbine inlet conduit is configured for fluid communication of a first portion of an exhaust gas flow received from an engine to the turbine wheel. The EGR conduit is configured for fluid communication of a second portion of the exhaust gas flow to an engine intake manifold.

9 Claims, 6 Drawing Sheets

(51) Int. Cl.
| | |
|---|---|
| *F04D 29/42* | (2006.01) |
| *F02B 37/18* | (2006.01) |
| *F04D 25/04* | (2006.01) |
| *F02M 26/09* | (2016.01) |
| *F02M 26/41* | (2016.01) |
| *F02B 29/04* | (2006.01) |
| *F02M 35/116* | (2006.01) |
| *F02M 26/05* | (2016.01) |
| *F02M 26/25* | (2016.01) |

(52) U.S. Cl.
CPC ............. *F02M 26/41* (2016.02); *F04D 25/04* (2013.01); *F04D 29/4246* (2013.01); *F02B 29/0406* (2013.01); *F02M 26/05* (2016.02); *F02M 26/25* (2016.02); *F02M 35/116* (2013.01); *Y02T 10/121* (2013.01); *Y02T 10/144* (2013.01)

(58) Field of Classification Search
USPC .......................................... 60/605.2; 701/108
See application file for complete search history.

(56) References Cited

U.S. PATENT DOCUMENTS

| | | | | |
|---|---|---|---|---|
| 5,579,643 | A * | 12/1996 | McEwen et al. ............... 60/602 |
| 5,937,650 | A * | 8/1999 | Arnold ......................... 60/605.2 |
| 5,943,864 | A | 8/1999 | Sumser et al. | |
| 5,947,681 | A | 9/1999 | Rochford | |
| 6,000,222 | A * | 12/1999 | Regnier .................. F01D 9/026 | |
| | | | | 60/605.2 |
| 6,032,465 | A * | 3/2000 | Regnier ....................... 60/605.2 |
| 6,050,095 | A * | 4/2000 | Blake ........................... 60/605.2 |
| 6,089,019 | A | 7/2000 | Roby et al. | |
| 6,145,313 | A * | 11/2000 | Arnold ......................... 60/605.2 |
| 6,263,672 | B1 * | 7/2001 | Roby ...................... F02B 37/22 |
| | | | | 123/568.11 |
| 6,301,889 | B1 * | 10/2001 | Gladden et al. .............. 60/605.2 |
| 6,324,847 | B1 * | 12/2001 | Pierpont ....................... 60/605.2 |
| 6,378,509 | B1 * | 4/2002 | Feucht ................... F02M 26/43 |
| | | | | 123/568.12 |
| 6,381,960 | B1 * | 5/2002 | M.ang.rdberg .................. 60/602 |
| 6,430,929 | B2 * | 8/2002 | Martin ..................... 123/568.18 |
| 6,494,041 | B1 * | 12/2002 | Lebold ......................... 60/605.2 |
| 7,363,761 | B1 * | 4/2008 | Dickerson ....................... 60/602 |
| 7,562,529 | B2 * | 7/2009 | Kuspert et al. .............. 60/605.2 |
| 7,574,862 | B2 * | 8/2009 | Giselmo et al. ................ 60/612 |
| 7,721,542 | B2 * | 5/2010 | Chen ........................... 60/605.2 |
| 8,206,133 | B2 * | 6/2012 | Mudel .......................... 417/406 |
| 2001/0032467 | A1 * | 10/2001 | Martin ....................... 60/605.2 |
| 2002/0100279 | A1 * | 8/2002 | Mulloy et al. .................. 60/602 |
| 2003/0230085 | A1 | 12/2003 | Sumser et al. | |
| 2004/0079079 | A1 * | 4/2004 | Martin et al. ................ 60/605.2 |
| 2007/0089415 | A1 * | 4/2007 | Shimokawa et al. ......... 60/605.2 |
| 2007/0144170 | A1 * | 6/2007 | Griffith ........................... 60/600 |
| 2009/0000296 | A1 * | 1/2009 | Pierpont et al. .................. 60/602 |
| 2010/0024414 | A1 * | 2/2010 | Hittle et al. ..................... 60/602 |
| 2010/0229551 | A1 * | 9/2010 | Wu et al. ..................... 60/605.1 |
| 2011/0048003 | A1 * | 3/2011 | Chen ............................ 60/605.2 |
| 2011/0067680 | A1 * | 3/2011 | Williams et al. ........ 123/568.21 |
| 2012/0159948 | A1 * | 6/2012 | Moroi et al. ..................... 60/602 |
| 2012/0222419 | A1 * | 9/2012 | Hittle et al. ................... 60/605.1 |

* cited by examiner

TURBOCHARGER AND AIR INDUCTION SYSTEM INCORPORATING THE SAME AND METHOD OF USING THE SAME

FIELD OF THE INVENTION

Exemplary embodiments of the present invention are related to a turbine housing, turbocharger and air induction system incorporating the same and method of making and using the same, and, more specifically to a turbine housing having an integral exhaust gas recirculation (EGR) conduit, and turbocharger and air induction system incorporating the same, as well as method for using the same.

BACKGROUND

The efficient use of exhaust gas recirculation (EGR) is very important to all modern internal combustion engines, including both gasoline and diesel engines. Efficient use of EGR generally supports the objectives of realizing high power output from these engines while also achieving high fuel efficiency and economy and achieving increasingly stringent engine emission requirements. The use of forced-induction, particularly including turbochargers, in these engines is also frequently employed to increase the engine intake mass airflow and the power output of the engine. However, turbochargers are also powered by exhaust gas, so the efficient use of EGR and turbocharged forced-induction necessitates synergistic design of these systems.

Turbocharged Diesel engines must be particularly efficient in the use of the energy available in the exhaust system, particularly EGR gas flows, in order to improve overall engine efficiency and fuel economy. Diesel EGR systems are required to deliver high volumes of EGR to the intake air system of the engine. In order to do so, the exhaust system must provide enough pressure change through the system, including the flow control valve, bypass valve and cooler to drive the desired EGR flow into the boosted intake system. The exhaust system must also provide adequate energy so that the turbine has sufficient power to provide the desired boost. Typical Diesel engine EGR systems feed EGR passages off various exhaust system components. EGR feed passages off the turbine housing have been proposed; however, such EGR feed passages have generally been at less than optimal angles to the desired gas flow direction within the turbine volute, through the use of elbows and the like, thereby creating high flow losses and low efficiency, thereby reducing the amount of EGR flow available for use in the air intake system. Such arrangements do not provide a sufficient volume of intake EGR.

In U.S. Pat. No. 6,430,929, a design has been proposed to associate an EGR outlet with a turbine volute and EGR valve. This design locates the EGR outlet tangentially to the volute and substantially linearly along the flowstream entering the turbine housing inlet. Thus, the EGR outlet is located at the volute inlet and the EGR outlet appears to define the volute inlet. The turbocharger described in this patent incorporates an EGR valve having a flanged elbow, where the hole pattern on the flange can be adjusted to orient the elbow to accommodate varying engine arrangements. The use of the elbow may also be necessitated by the in-line or linear arrangement of the EGR outlet and turbine inlet. However, use of the elbow configuration has an efficiency loss associated therewith. The turbocharger of the '929 patent also incorporates a variable geometry nozzle that is used to increase back pressure in the EGR system. While potentially useful, the costs of variable nozzle turbochargers are significantly higher than those having fixed nozzles. Further, increases in back pressure observed by closing the turbine vanes of a variable nozzle are nearly outweighed by the resultant increase in boost pressure of the intake air, such that the desired increases in EGR flow in the induction system are not achievable.

Accordingly, it is desirable to provide turbine housings, turbochargers and intake air systems that use them and associated methods of use that enhance EGR available for use in the induction system while at the same time providing sufficient exhaust gas flow to drive the turbine and generate the desired pressure boost and air induction into the air intake system, regardless of whether the turbochargers use either fixed or variable nozzle turbines.

SUMMARY OF THE INVENTION

In one exemplary embodiment of the present invention, a turbocharger is provided. The turbocharger includes a turbine comprising a turbine wheel attached to a turbine shaft, the turbine wheel and shaft rotatably disposed in a turbine housing having a turbine inlet conduit having a turbine inlet passage fluidly coupled to a turbine volute conduit having a turbine volute passage and a turbine volute inlet and an EGR conduit having an EGR conduit passage, the EGR conduit passage having an EGR conduit inlet, the EGR conduit inlet disposed on the turbine inlet conduit, the turbine inlet conduit configured for fluid communication of a first portion of an exhaust gas flow received from an engine to the turbine wheel, the EGR conduit configured for fluid communication of a second portion of the exhaust gas flow to an engine intake manifold. The turbocharger also includes a compressor comprising a compressor wheel attached to the turbine shaft and configured for fluid communication of a forced-induction airflow to an engine intake manifold.

In another exemplary embodiment of the present invention, an intake air system for an internal combustion engine is provided. The intake air system includes a turbocharger comprising a turbine and a compressor. The turbine includes a turbine wheel attached to a turbine shaft, the turbine wheel and shaft rotatably disposed in a turbine housing. The turbine housing includes a turbine inlet conduit having a turbine inlet passage fluidly coupled to a turbine volute conduit having a turbine volute passage and a turbine volute inlet and an EGR conduit having an EGR conduit passage, the EGR conduit passage having an EGR conduit inlet, the EGR conduit inlet disposed on the turbine inlet conduit, the EGR conduit in fluid communication with an EGR valve inlet. The compressor is configured for fluid communication of a forced-induction airflow to an engine intake manifold. The intake air system also includes an EGR valve switchable between at least an open and a closed position and having an EGR valve inlet and an EGR valve outlet, the EGR valve outlet also in fluid communication with the intake manifold of an engine, the open position enabling fluid communication from the EGR conduit to the engine intake manifold and defining a first operating mode, and the closed position disabling fluid communication from the EGR conduit to the engine intake manifold and defining a second operating mode, wherein in the first mode an EGR gas flow from the EGR conduit is promoted within the engine intake manifold.

In yet another exemplary embodiment of the present invention, a method of using an intake air system for an internal combustion engine is provided. The method includes providing an internal combustion engine having a turbocharger in fluid communication with an intake manifold of the engine and configured to provide a forced-induction airflow thereto having a first pressure, the turbocharger comprising a turbine housing, the turbine housing comprising a turbine inlet conduit having a turbine inlet passage and an EGR conduit having an EGR passage, the EGR passage having an EGR conduit inlet, the EGR conduit inlet disposed on the turbine conduit inlet, the EGR conduit configured for fluid communication of an EGR flow to an EGR valve switchable between an open and a closed position, the open position enabling fluid communication of the EGR flow having a second pressure to the intake manifold and defining a first operating mode, and the closed position disabling fluid communication from the EGR conduit to the intake manifold and defining a second operating mode, wherein in the first mode the second pressure is greater than the first pressure and an EGR flow to the engine is promoted within the intake manifold. The method also includes operating the engine to produce an exhaust gas flow into the turbine volute inlet. The method also includes selecting the first mode or the second mode while operating the engine.

The above features and advantages and other features and advantages of the present invention are readily apparent from the following detailed description of the best modes for carrying out the invention when taken in connection with the accompanying drawings.

BRIEF DESCRIPTION OF THE DRAWINGS

Other objects, features, advantages and details appear, by way of example only, in the following detailed description of embodiments, the detailed description referring to the drawings in which.

DESCRIPTION OF THE EMBODIMENTS

The present invention discloses an exemplary embodiment of a turbine housing, and exemplary embodiments of a turbocharger and air induction system that incorporate the turbine housing, as well as associated methods of their use that enhance EGR available for use in the air induction system while at the same time also providing sufficient exhaust flow to drive the turbine and generate the desired pressure boost and induction airflow into the air intake system. The turbine housing has an EGR conduit or passage which directly bypasses or shunts a portion of the exhaust gas flow from the turbocharger and provides EGR flow for mixing with the forced-induction intake airflow to produce a combustion airflow that includes EGR.

The present invention provides EGR available for use in the induction system while at the same time providing sufficient exhaust flow to drive the turbine and generate the desired pressure boost and air induction into the air intake system. It also provides high volumes of EGR to the intake manifold system of an internal combustion engine. The invention balances the utilization of cylinder exhaust energy to both drive the turbine wheel and provide the desired EGR flow into the air intake system by splitting the exhaust flow adjacent to the turbine volute inlet. While the invention is particularly useful in conjunction with variable nozzle turbines (VNT's), the devices and methods disclosed can be used with both (VNT) and fixed nozzle turbines providing an advantageous air intake system configuration that maximizes the quantity of EGR that can be provided to the engine with a minimal implementation complexity and cost. These devices and methods provide a low restriction, high dynamic pressure feed point to the intake air system through the EGR system, and are particularly useful for providing EGR into the air intake system.

Figure 1:
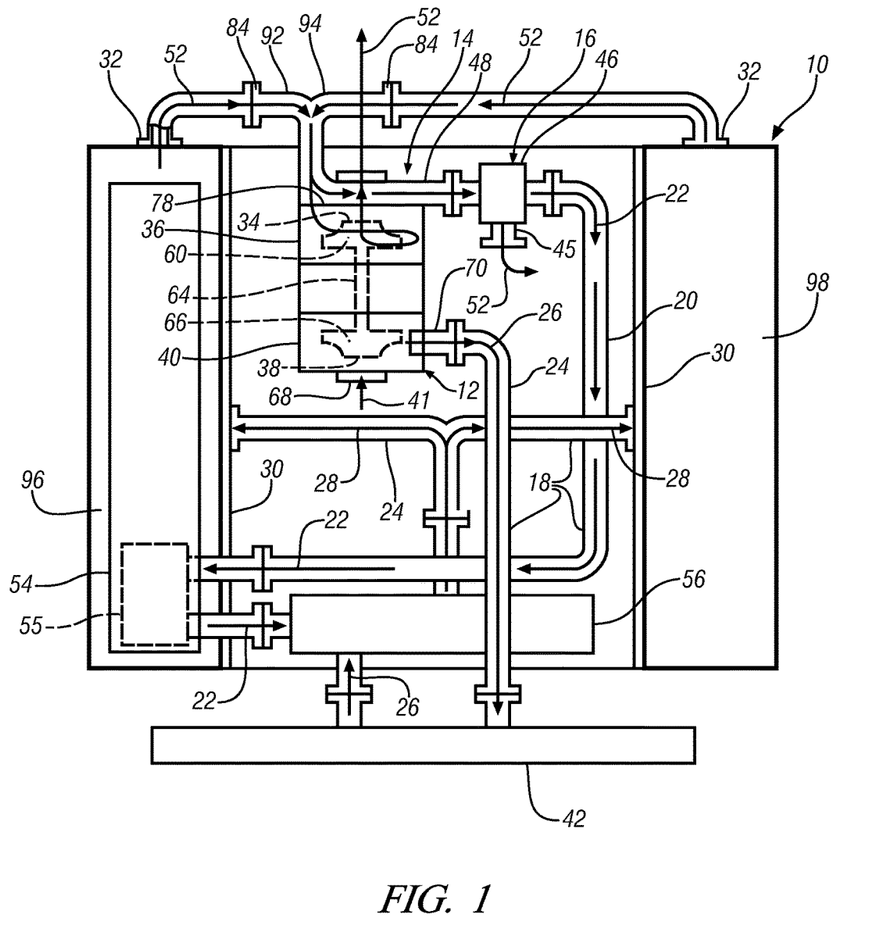
FIG. 1 is a schematic view of an exemplary embodiment of a forced-induction intake air system for an internal combustion engine as disclosed herein.
Figure 2:
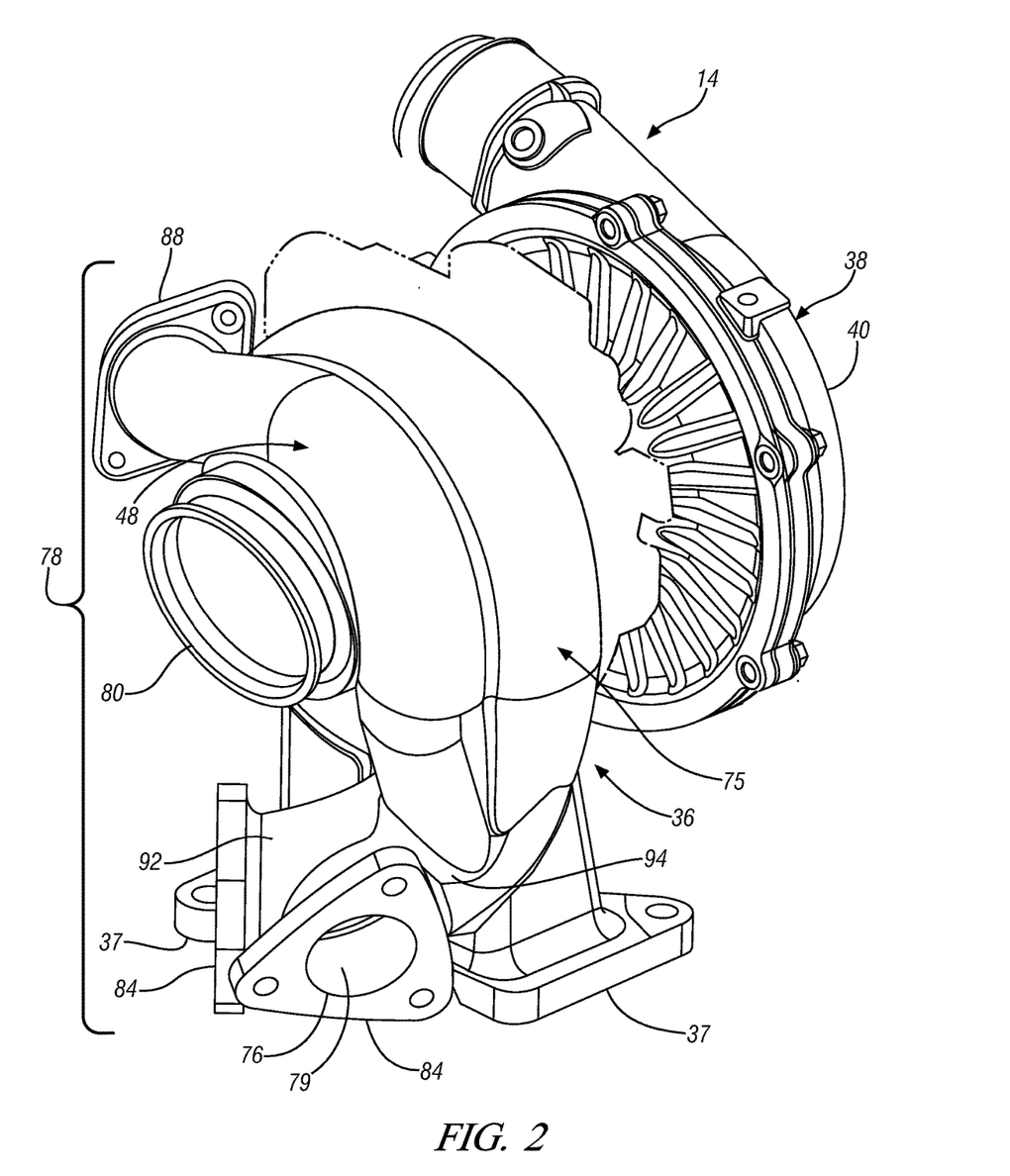
FIG. 2 is a front perspective view of an exemplary embodiment of a turbocharger as disclosed herein.
Figure 3:
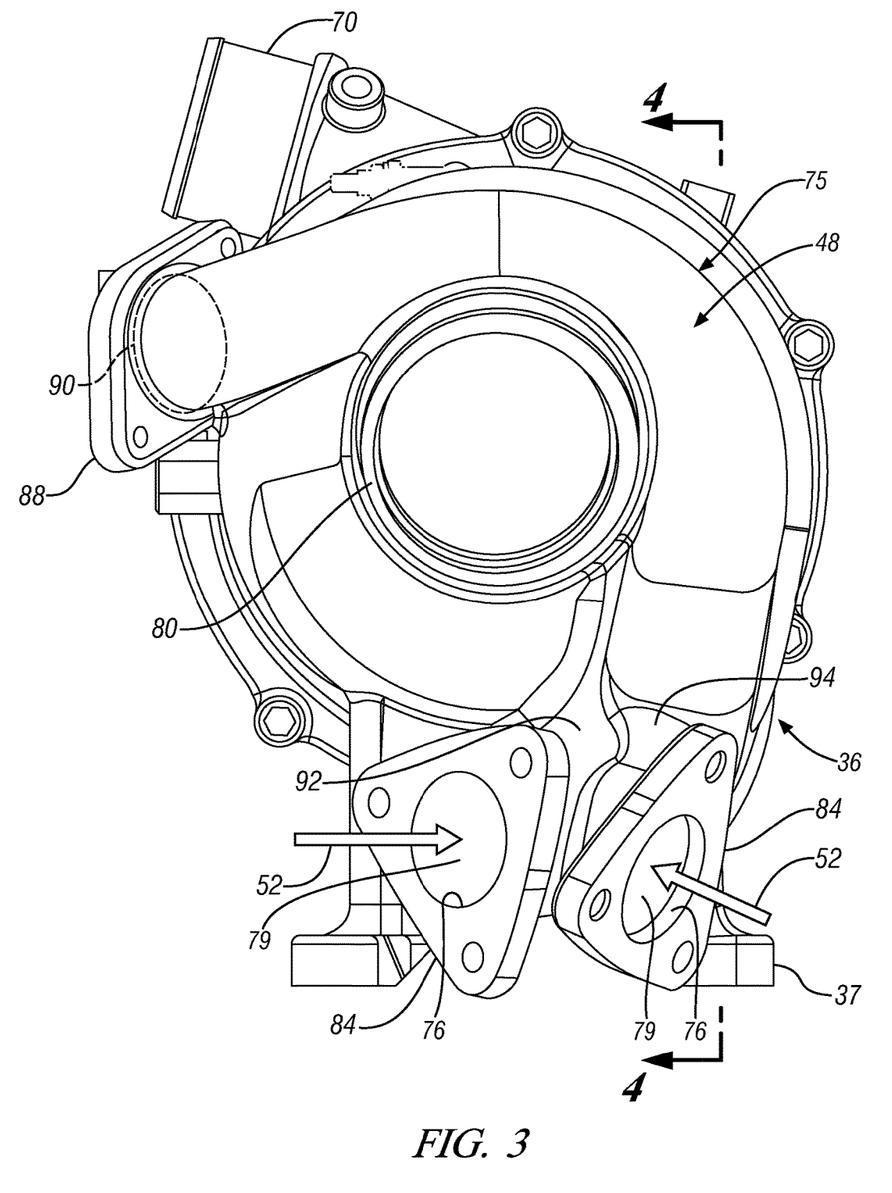
FIG. 3 is a front view of the turbocharger of FIG. 2.

As illustrated in FIG. 1, in accordance with an exemplary embodiment of the present invention, an internal combustion engine 10 includes a forced-induction system 12, including turbocharger 14, and an EGR system 16 that respectively supply intake air or EGR, or a combination or mixture thereof, to air intake system 18. Air intake system 18 includes EGR intake conduit 20 configured for fluid communication of a pressurized or forced-induction EGR flow represented by arrow 22 and turbocharger intake conduit 24 configured for fluid communication of a pressurized, forced-induction airflow represented by arrow 26. EGR flow 22 and airflow 26 are used to make up the pressurized or forced-induction combustion flow 28 that provides pressurized, forced-induction air or EGR, or a combination or mixture thereof, to engine 10 for combustion. Air intake system 18 also includes an intake manifold 30, or plurality of manifolds, that receives combustion flow 28 and distributes the combustion flow 28 to the engine cylinders (not shown). Air intake system 18 may also, optionally, include other intake system devices downstream of EGR intake conduit 20 and turbocharger intake conduit 24 and upstream of intake manifold 30, including coolers for both EGR flow 22 and forced-induction airflow 26, as well as a mixer for combining these airflows, as described herein.

Forced induction system 12 includes a turbocharger 14 that includes a turbine 34 contained in a turbine housing 36 and a compressor 38 contained in a compressor housing 40, for compressing ambient intake air illustrated by arrow 41 and producing a pressurized, forced-induction airflow 26 for combustion in engine 10. Intake airflow 41 is heated during the turbocharger compression process and may be cooled to improve volumetric efficiency by increasing intake air charge density through isochoric cooling. That cooling may be accomplished by routing the forced-induction airflow 26 discharged from the turbocharger 14 to a turbocharger air cooler 42, which may also be referred to as an inter cooler or after cooler, via intake conduit 24. Turbocharger air cooler 42 may be engine mounted. The forced-induction air flow 26 is then routed from the turbocharger air cooler 42 through turbocharger intake conduit 24 to intake manifold 30 for distribution to the cylinders of engine 10.

Forced-induction system 12 also includes an EGR system 16. EGR system 16 includes an EGR control valve 46. EGR control valve 46 is in fluid communication with, and regulates the release of, exhaust gas as EGR from the turbine housing 36 through EGR conduit 48, as further explained herein. EGR control valve 46 is configured to control the release of a portion of the exhaust gas flow 52 that is taken from the exhaust manifold 32, that would otherwise pass through turbine housing 36 via turbine volute conduit 50 (see FIG. 6), for use as EGR flow 22. EGR flow 22 passes through EGR conduit 48 and EGR control valve 46 as part of EGR system 16 where it is mixed with the forced-air induction system 12. EGR system 16 may also include an EGR cooler 54, or heat exchanger, that may also be engine-mounted for cooling the EGR flow 22 passing through the system. By providing a heat exchanger in the EGR system 16, EGR cooler 54 may also provide for increased efficiency of engine 10. EGR cooler 54 may also include a bypass valve 55 that permits the EGR flow 22 to bypass the cooler during periods when cooling is not needed or desirable, such as at a cold engine startup. The EGR flow 22 passing through or bypassing EGR cooler 54 is combined with the forced-induction airflow 26 that has in turn passed through the turbocharger air cooler 42 to provide force-induction combustion (air+EGR) flow 28. The gas flows 22 and 26 may be combined using intake charge mixer 56 to improve the homogeneity of the combustion flow 28 before the flow enters the intake manifold 30 of the engine 10. Forced-induction system 12 may be operated without unduly affecting the efficiency of turbocharger 14 with undesirable pressure or flow pulsations by providing an exhaust conduit 45 in conjunction with EGR control valve 46. When EGR control valve 46 is open, EGR flow 22 is provided to air intake system 18, and when the valve is closed, EGR flow 22 that is provided to the valve may be shunted through appropriate conduits (not shown) to the exhaust system (not shown) as exhaust gas flow 52 (i.e., functioning as an EGR wastegate). Thus, the respective portions of exhaust gas flow 52 routed through EGR conduit 48 as EGR flow 22 and turbine volute conduit 50 remain substantially the same as the EGR control valve 46 is opened and closed. This prevents increasing or decreasing the portion of the exhaust gas flow 52 into the turbine volute, and hence the turbine efficiency, when the EGR valve is opened or closed. Alternately, EGR control valve 46 may include a simple open/close valve configuration without the shunt illustrated in FIG. 1 and turbocharger 14 may include a wastegate (not shown) to divert the increase in exhaust gas flow 52 that results from closure of EGR valve 46 and avoid undesirable pressure or flow pulsations.

FIGS. 1-4 show an exemplary embodiment of a turbine housing 36, and turbocharger 14 that uses the housing, in greater detail. Turbine housing 36 may include one or more mounting flanges 37 for mounting the housing to the engine 10. Turbine housing 36 includes one or more turbine inlets 76. Turbine inlet 76 opens into turbine inlet conduit 77, FIG. 6, which defines turbine inlet passage 79. The one or more turbine inlets 76 may be associated with one or more respective branches 92, 94 of inlet conduit 77. For example, in the embodiments of FIGS. 1-8, there are two turbine inlets 76 and their respective conduits 92, 94 comprise two branches that merge into a single inlet conduit 77. Turbine housing 36 also includes a housing body 78 that includes a turbine volute 75 that defines the turbine volute conduit 50 and associated turbine volute passage 58 and the turbine outlet 80. Housing 36 also includes an EGR conduit inlet 74 that is located proximate and upstream of the turbine volute inlet 82.

Figure 6:
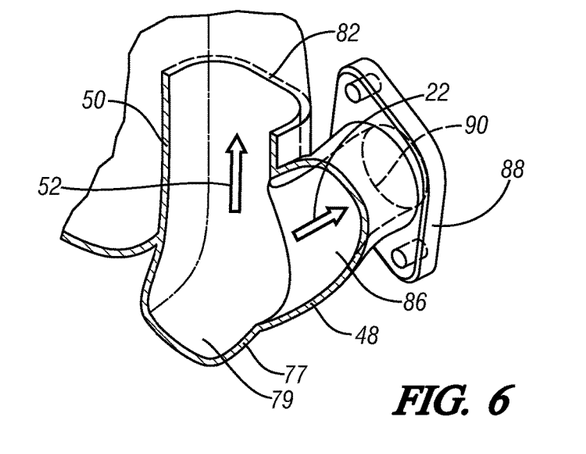
FIG. 6 is a cross-sectional view of the turbine housing of FIG. 5 taken along section 6-6.
Figure 7:
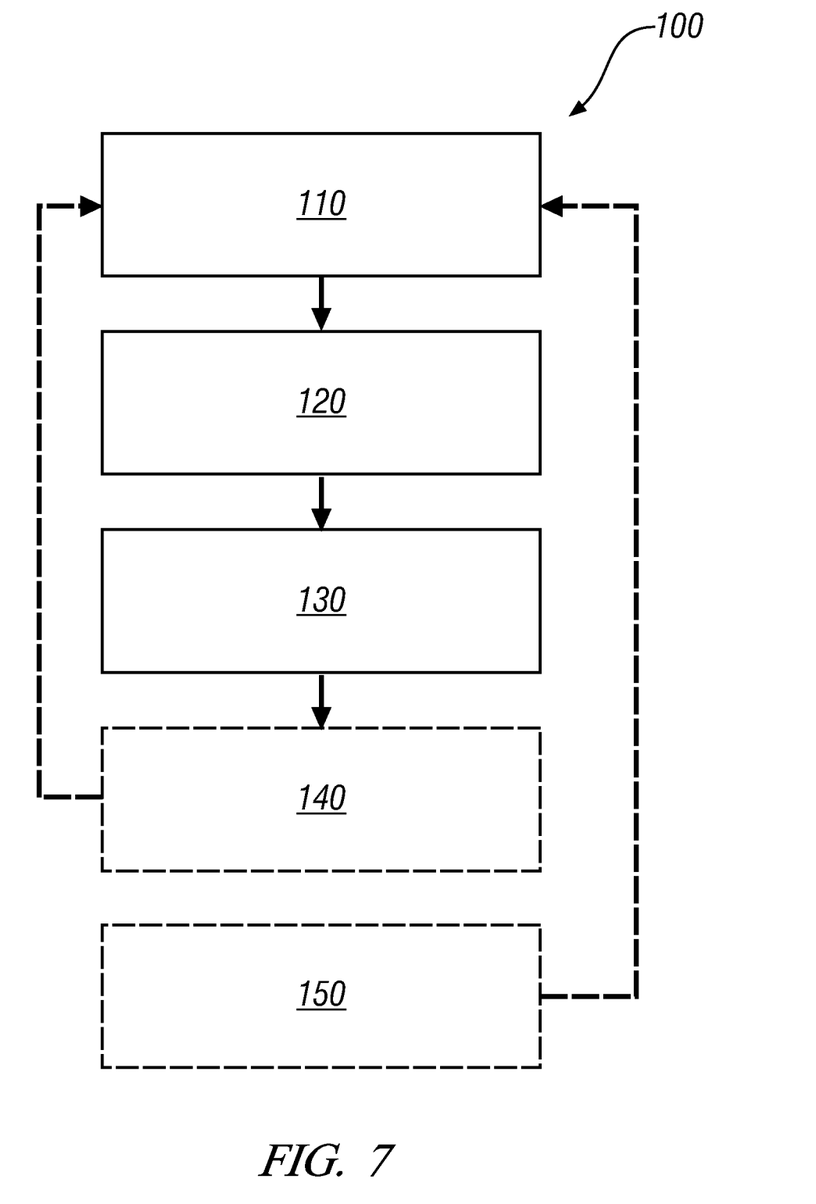
FIG. 7 is a flowchart of an exemplary method of using an intake air system as disclosed herein.

Referring to FIGS. 1-4, turbine housing inlets 76 may be attached directly to the exhaust manifold 32, or a plurality of manifolds, of the engine 10, or may be attached indirectly through additional exhaust conduits (not shown). Turbine housing inlets 76 may be incorporated into one or more mounting flanges 84 for detachable attachment as described using a plurality of threaded bolts, clamps or the like (not shown). Exhaust gas flows 52 (FIG. 3) entering the turbine housing inlets 76 are combined into a single exhaust gas flow 52 that flows into turbine volute conduit 50 at turbine volute inlet 82. Referring to FIG. 6, turbine volute conduit 50 has an inwardly curving and converging turbine volute passage 58, such as a spiroidal-shaped curving passage. As turbine volute passage 58 converges away from turbine volute inlet 82, the cross-sectional area of the passage is progressively reduced. The progressive reduction of turbine volute passage 58 progressively increases the speed of exhaust gas flow 52 within the passage. The turbine volute conduit 50 spirals inwardly about turbine wheel 60 (FIG. 1) which is in fluid communication with conduit 50 and turbine volute passage 58 through circumferentially extending turbine nozzle 25. Nozzle 25 directs exhaust gas flow 52 across turbine blades (not shown) on turbine wheel 60 and exhausted through turbine outlet 80, thereby causing rotation of turbine wheel 60 and turbine shaft 64, FIG. 1, to which it is attached, which in turn rotates the compressor wheel 66 that is attached to the opposite end of shaft 64. Rotation of the compressor wheel 66 draws air into the compressor intake 68 which is then compressed as it passes through the compressor nozzle (not shown) and expelled through compressor volute conduit 70 as forced-induction airflow 26.

Figure 4:
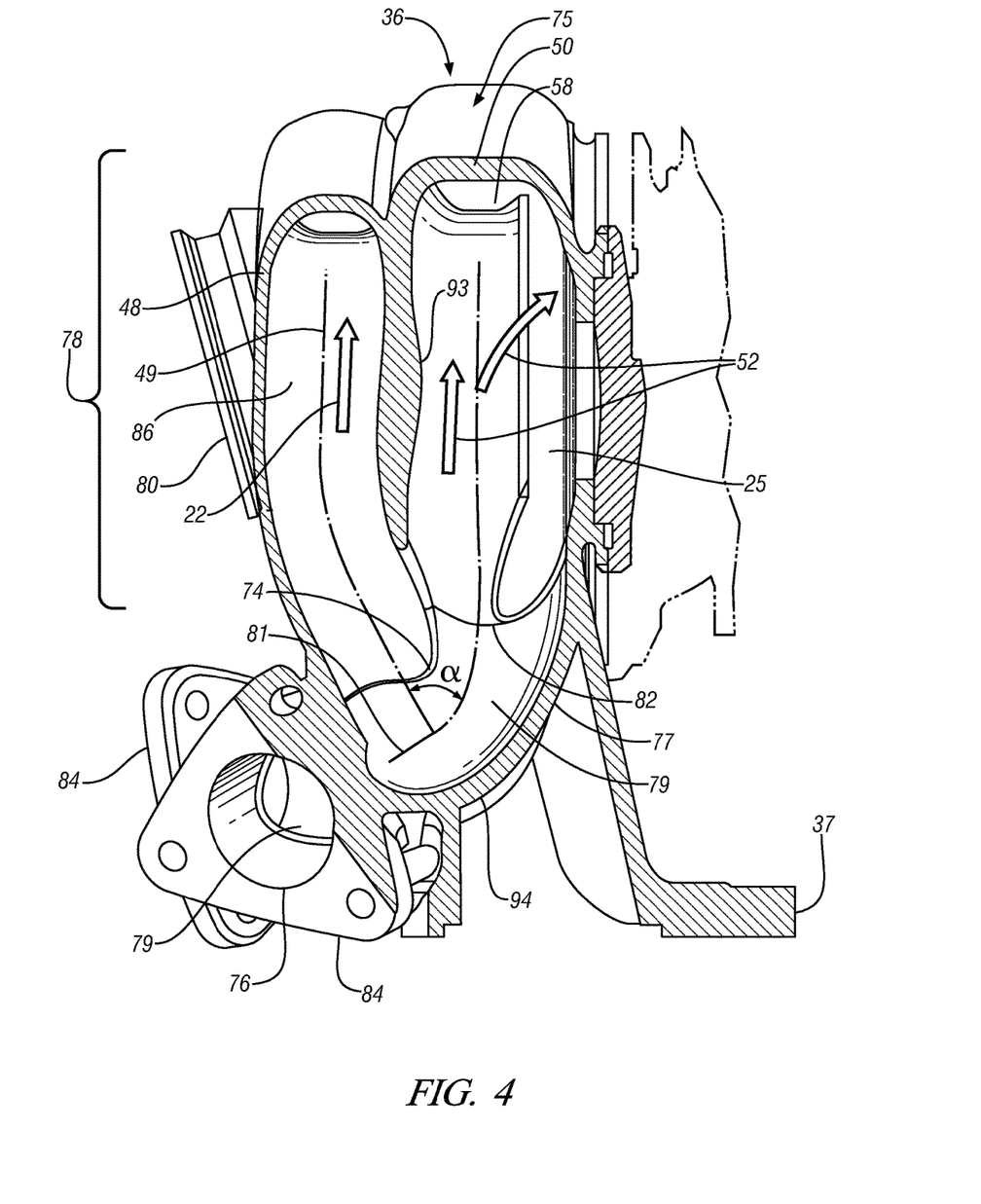
FIG. 4 is a cross-sectional view of the turbine housing of FIG. 3 taken along section 4-4.

Referring to FIG. 4, an EGR conduit inlet 74, or opening, from the turbine inlet conduit 77 is formed in turbine housing 36. In an exemplary embodiment, EGR conduit inlet 74 is located in turbine inlet conduit 77 proximate to and upstream of turbine volute inlet 82. EGR conduit inlet 74 opens into EGR conduit 48 that is disposed on turbine housing 36 over the EGR conduit inlet 74. EGR conduit 48 defines an EGR conduit passage 86. EGR conduit 48 may have a substantially similar size and shape as EGR conduit inlet 74 so that a smooth transition occurs between turbine inlet conduit 77 and EGR conduit 48. EGR conduit passage 86 (FIG. 6) and EGR conduit inlet 74 may have any suitable cross-sectional shape or area and orientation with respect to the turbine inlet conduit 77 and turbine inlet passage 79 sufficient to provide a predetermined EGR flow 22, as well as a predetermined exhaust gas flow 52 through turbine volute passage 58 and the turbine nozzle 25. In an exemplary embodiment, a cross-sectional area of the EGR conduit passage 86 is less than or equal to the cross-sectional area of the turbine volute passage 58. The cross-sectional area of EGR conduit passage 86 may be the same along its length, or alternately, may progressively converge or diverge. In the exemplary embodiment of FIG. 4, EGR conduit inlet 74 is oriented with a central axis 49 of EGR conduit 48 and EGR conduit passage 86 intersecting a central axis 81 of turbine inlet conduit 77 and turbine inlet passage 79 at an acute angle ($\alpha$) adjacent to their intersection in order to minimize losses in EGR flow 22. It is preferred that $\alpha$ be minimized to minimize energy losses in EGR flow 22, and particularly that $\alpha$ be less than about 30°, and even more particularly about 10°. The EGR conduit passage 86 and turbine volute passage 58 should be sized to obtain a predetermined EGR flow 22 and a predetermined forced-induction airflow 26, wherein the pressure of EGR flow 22 is greater than the pressure of forced-induction airflow 26, thereby promoting a predetermined EGR flow 22 portion of forced-induction combustion flow 28. EGR conduit 48 may also include a mounting flange 88, FIG. 3, proximate EGR conduit outlet 90 for fluid coupling and detachable attachment to EGR intake conduit 20, as described herein, using a plurality of threaded bolts, clamps or the like (not shown).

Figure 5:
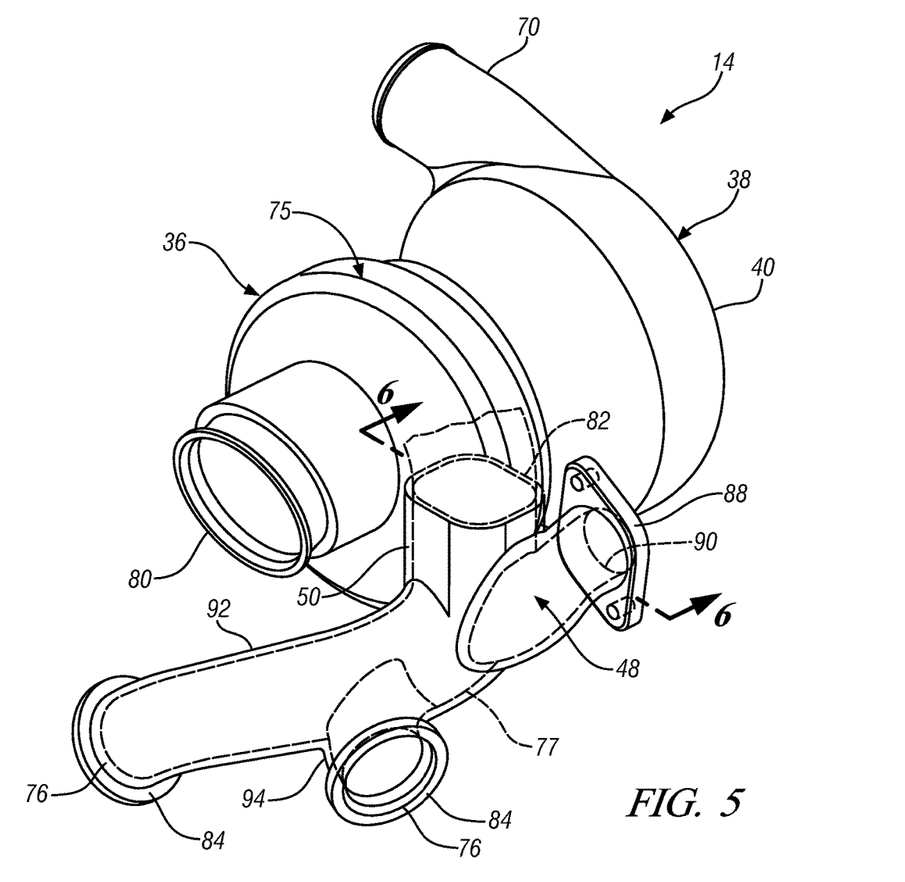
FIG. 5 is a front perspective view of a second exemplary embodiment of a turbocharger as disclosed herein.

Referring to FIGS. 1-6, EGR conduit 48 may advantageously be extended around the periphery of housing body 78 to provide EGR conduit outlet 90 in any desired orientation for attachment to the remainder of EGR system 16, including EGR control valve 46 or conduits 20. In certain embodiments, EGR conduit 48 extends about 30° to about 190° around the periphery of housing body 78. For example, in the exemplary embodiment of FIGS. 1-6, EGR conduit 48 extends about 120° around the periphery of housing body 78. This design flexibility can be very advantageous with regard to packaging of various devices and routing of the various conduits associated with forced-induction system 12. In another example, as illustrated in FIGS. 5 and 6, EGR conduit 48 may be directed away from housing body 78 such that it does not follow the periphery of housing body 78 and is in fact directed away from this body. While EGR conduit 48 is an integral part of turbine housing 36, the association of housing body 78, and particularly turbine volute 75 with EGR conduit 48 is flexible, providing the ability to orient EGR conduit outlet 90 in a wide variety of locations and orientations with respect to turbine volute 75. For example, EGR conduit 48 may be formed integrally with turbine volute conduit 50 as illustrated in FIGS. 1-4, where these conduits share a common wall 93 along a portion of their lengths. Alternately, EGR conduit 48 as illustrated in FIGS. 1-4 could have been similarly oriented but separated from turbine volute conduit 50 (not shown) such that they did not share a common wall, but rather comprised two separate conduits with the general orientation shown in FIGS. 1-4. As another example of the advantageous flexibility associated with the location of EGR conduit 48, referring to FIGS. 5 and 6, the conduit may be oriented so that it is completely detached from turbine volute 75 and turbine volute conduit 50.

Turbine housing 36 having the configurations described above may be utilized with a wide variety of internal combustion engines 10, particularly diesel engines. In one exemplary embodiment, turbine housing 36 may have a single turbine inlet conduit 77 and associated turbine inlet 76 and may be used with an engine 10 having a single exhaust conduit (not shown) associated with the turbine inlet conduit 77, such as where the engine is an in-line or straight cylinder configuration having a single exhaust manifold and exhaust conduit. In another exemplary embodiment, the engine may comprise a v-type cylinder configuration having spaced cylinder banks that are radially-spaced about a crankshaft axis where each bank has an exhaust conduit that merges into a single exhaust conduit (not shown) prior to attachment to turbine inlet conduit 77. An example of a V-type engine 10 having a first cylinder bank 96 and associated exhaust port comprising manifold 32 that is fluid communication with first inlet conduit branch 92 and a second cylinder bank 98 having a second exhaust port associated with exhaust manifold 32 in fluid communication with second inlet conduit branch 94 is illustrated in FIG. 1.

Turbine housing 36 and the portions thereof described above may be made individually, in any combination, and assembled together to make the housing. Alternately, turbine housing 36, as described herein, may be formed as an integral whole, such as by casting the housing. Suitable materials for use as a turbine housing 36 include various grades and alloys of cast iron and steel. Further, turbine housing 36 may receive any suitable secondary finishing operation, including cleaning, machining and the like.

Referring to FIGS. 1-9, in accordance with yet another exemplary embodiment of the present invention, a method 100 of using an intake air system 18 for an internal combustion engine 10 is provided. Method 100 includes providing 110 an internal combustion engine 10 having a turbocharger 14 in fluid communication with an intake manifold 30 of the engine and configured to provide a forced-induction airflow 26 thereto having a first pressure. The turbocharger 14 includes a turbine housing 36 that includes turbine inlet conduit 77. Turbine inlet conduit 77 has a turbine inlet 82 and an EGR conduit inlet 74 that is radially spaced from the volute inlet along the turbine volute conduit and opens into an EGR conduit 48 that is disposed on the turbine housing 36. The EGR conduit 48 is configured for fluid communication of EGR flow 22 to an EGR control valve 46 that is switchable between an open and a closed position. The open position enables fluid communication of EGR flow 22 having a second pressure to the intake manifold 30 and defines a first operating mode. The closed position disables fluid communication from the EGR conduit 48 to the intake manifold 30 and defines a second operating mode. In the first mode, the second pressure of the EGR flow 22 is greater than the first pressure of the forced-induction airflow 26, and EGR flow 22 to the engine is promoted within the intake manifold 30. Method 100 also includes operating 120 the engine 10 to produce exhaust gas flow 52 in the turbine volute conduit 50 at turbine volute inlet 82. Method 100 also includes selecting 130 the first mode or the second mode while operating the engine. Selecting 130 may be performed using a suitable controller, such as an engine control unit (ECU). In the first mode, the efficiency of the turbocharger and the first pressure are reduced in conjunction with providing the EGR flow 22 to the intake manifold 30. Optionally, method 100 also includes selecting 140 the radial spacing of the turbine volute inlet 82 and EGR conduit inlet 74 to obtain a predetermined EGR flow 22, as described herein. Optionally, the EGR control valve 46 is a variable EGR control valve 46 switchable between the open position, the closed position and a plurality of partially open positions therebetween that define a corresponding plurality of operating modes, wherein the method further comprises selecting 150 one of the plurality of operating modes, and wherein in the first operating mode and the plurality of operating modes, the second pressure is greater than the first pressure, thereby promoting a corresponding plurality of EGR flows into the intake manifold 30.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. A turbocharger, comprising:
   a turbine, the turbine comprising a turbine wheel, a turbine shaft and a turbine housing, the turbine wheel attached to the turbine shaft, the turbine wheel and shaft rotatably disposed in the turbine housing, the turbine housing comprising:
   a turbine inlet conduit having a turbine inlet passage that is fluidly coupled to a turbine volute conduit having a turbine volute passage and a turbine volute inlet;
   an EGR conduit having an EGR passage, the EGR passage having an EGR conduit inlet, the EGR conduit inlet disposed downstream of the turbine inlet conduit and located upstream of the turbine volute inlet, the turbine inlet conduit configured for fluid communication of a first portion of an exhaust gas flow received from an engine to the turbine wheel via the turbine volute passage, the EGR conduit configured for fluid communication of a second portion of the exhaust gas flow to an engine intake manifold, the first portion and the second portion being separated upstream of the turbine volute inlet via the turbine volute inlet and the EGR conduit inlet, respectively, wherein the EGR conduit is integrally formed with the turbine volute conduit, the EGR conduit and the turbine volute conduit sharing a common wall along a portion of their lengths, and wherein the cross-sectional area of the EGR conduit passage is less than or equal to the cross-sectional area of the turbine volute passage; and an EGR valve located downstream of the EGR conduit inlet and the turbine volute inlet, the EGR valve switchable between at least an open and a closed position, the open position enabling fluid communication from the EGR conduit to the engine intake manifold and defining a first operating mode, and the closed position disabling fluid communication from the EGR conduit to the engine intake manifold and defining a second operating mode, wherein the second portion of exhaust gas flow is routed through the EGR conduit as exhaust to a location other than the engine intake manifold and the turbine wheel when the EGR valve is in the closed position.

2. The turbocharger of claim 1, wherein the EGR conduit has an EGR conduit axis proximate the EGR inlet and the turbine inlet conduit has a turbine inlet conduit axis proximate the EGR inlet, and wherein the turbine inlet conduit axis is separated from the EGR conduit axis by an angle α that is 10° to less than 3 0°.

3. The turbocharger of claim 1, wherein the turbine inlet conduit comprises a plurality of inlet conduits.

4. The turbocharger of claim 1, further comprising a diesel engine having a first exhaust port and a second exhaust port, wherein the turbine inlet conduit comprises a first conduit branch and a second conduit branch.

5. The turbocharger of claim 4, wherein the diesel engine is a V-type engine having a first cylinder bank and a radially separated second cylinder bank, the first exhaust port disposed on the first cylinder bank and in fluid communication with the first conduit branch, the second exhaust port disposed on the second cylinder bank and in fluid communication with the second conduit branch.

6. The turbocharger of claim 1, wherein the turbine volute conduit and EGR conduit comprise an integral metal casting.

7. The turbine housing of claim 1, wherein the turbine volute conduit, EGR conduit and turbine inlet conduit comprise an integral metal casting.

8. A method of using an intake air system for an internal combustion engine, comprising:

providing an internal combustion engine having a turbocharger in fluid communication with an intake manifold of the engine and configured to provide a forced-induction airflow thereto having a first pressure, the turbocharger comprising a turbine housing, the turbine housing comprising a turbine inlet conduit having a turbine inlet passage and an EGR conduit having an EGR passage, the EGR passage having an EGR conduit inlet, the EGR conduit inlet disposed downstream of the turbine inlet conduit and located upstream of the turbine volute inlet, the EGR conduit configured for fluid communication of an EGR flow to an EGR valve located downstream of the EGR conduit inlet and the turbine volute inlet and switchable between an open and a closed position, the open position enabling fluid communication of the EGR flow having a second pressure to the intake manifold and defining a first operating mode, and the closed position disabling fluid communication from the EGR conduit to the intake manifold and defining a second operating mode, wherein in the first mode the second pressure is greater than the first pressure and an EGR flow to the engine is promoted within the intake manifold;

operating the engine to produce an exhaust gas flow into the turbine inlet conduit;

flowing a first portion of the exhaust gas flow into the turbine volute conduit and an adjacent, second portion of the exhaust gas flow into a EGR conduit via the turbine volute inlet and the EGR conduit inlet, respectively, wherein the first portion and the second portion flowing through the turbine volute conduit and the EGR conduit are separated by a common wall separating the EGR conduit and the turbine volute conduit, the conduits being integrally formed;

routing the second portion of exhaust gas flow through the EGR conduit as exhaust to a location other than the engine intake manifold and the turbine wheel when the EGR valve is in the closed position; and selecting the first mode or the second mode while operating the engine.

9. The method of claim 8, wherein the EGR valve is a variable EGR valve switchable between the open position, the closed position and a plurality of partially open positions therebetween that define a corresponding plurality of partially open operating modes, and wherein the method further comprises selecting one of the plurality of partially open operating modes, and wherein in the first operating mode and the plurality of partially open operating modes, the second pressure is greater than the first pressure, thereby promoting a corresponding plurality of EGR flows into the engine intake conduit.

* * * * *